US008627661B2

(12) United States Patent
Berg

(10) Patent No.: US 8,627,661 B2
(45) Date of Patent: Jan. 14, 2014

(54) TURBOCHARGER EXHAUST ARRANGEMENT

(76) Inventor: Steve Berg, Spokane, WA (US)

( * ) Notice: Subject to any disclaimer, the term of this patent is extended or adjusted under 35 U.S.C. 154(b) by 474 days.

(21) Appl. No.: 12/832,906

(22) Filed: Jul. 8, 2010

(65) Prior Publication Data

US 2011/0005197 A1    Jan. 13, 2011

Related U.S. Application Data

(60) Provisional application No. 61/224,414, filed on Jul. 9, 2009.

(51) Int. Cl.
*F02B 33/44* (2006.01)
(52) U.S. Cl.
USPC .............................. 60/605.1; 60/597; 60/605.2
(58) Field of Classification Search
USPC ...................................... 60/605.1, 597, 605.2
See application file for complete search history.

(56) References Cited

U.S. PATENT DOCUMENTS

| | | | | |
|---|---|---|---|---|
| 4,483,147 A | * | 11/1984 | Evans et al. | 60/611 |
| 5,154,058 A | * | 10/1992 | Mizuno | 60/612 |
| 6,397,588 B1 | * | 6/2002 | Bruck et al. | 60/299 |
| 7,802,428 B2 | * | 9/2010 | Perrin et al. | 60/602 |

FOREIGN PATENT DOCUMENTS

JP        2007071141 A  *  3/2007

* cited by examiner

*Primary Examiner* — Ching Chang
(74) *Attorney, Agent, or Firm* — Rainier Patents, P.S.; Paul W. Mitchell

(57) ABSTRACT

The present concepts relate to turbocharger exhaust arrangements. One example involves a system that includes an internal combustion engine configured with a turbocharger. The system also includes an exhaust arrangement comprising a post-turbocharger (PT) exhaust pipe connected to the turbocharger and positioned proximate to the internal combustion engine, the PT exhaust pipe extending away from the turbocharger along the internal combustion engine. The PT exhaust pipe includes a first portion extending above at least one part of a set of header exhaust pipes connecting the internal combustion engine with the turbocharger. The PT exhaust pipe also includes one or more additional connected and contiguous portions extending below at least one other part of the set of header exhaust pipes.

15 Claims, 10 Drawing Sheets

TURBOCHARGER EXHAUST ARRANGEMENT

PRIORITY

This patent application is a non-provisional that claims priority from U.S. Provisional Application Ser. No. 61/224,414 filed Jul. 9, 2009.

BACKGROUND

Existing turbocharger exhaust solutions for internal combustion engines are associated with several disadvantages that include excessive engine compartment bulkiness and exhaust pipe bending that can result in unwanted engine backpressure.

BRIEF SUMMARY

Techniques are described for leveraging the cylinder arrangement of internal combustion engines to provide an exhaust arrangement that includes a post-turbocharger exhaust pipe positioned in a geometrically advantageous manner to conserve space and/or reduce or eliminate engine backpressure by, for example, allowing for gradual bending of the post-turbocharger exhaust pipe and/or one or more header exhaust tubes or pipes.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced (where feasible).

DETAILED DESCRIPTION

Overview

Techniques are described for leveraging the cylinder arrangement of internal combustion engines to provide an exhaust arrangement that includes a post-turbocharger (PT) exhaust pipe positioned in a geometrically and spatially advantageous manner to conserve space and/or reduce or eliminate engine backpressure by, for example, allowing for gradual bending of the PT exhaust pipe and/or one or more header exhaust tubes or pipes. Thus, the traditional cost of reducing engine backpressure at the expense of implementing bulky exhaust pipe components can be avoided. While a Chevrolet brand small block engine is illustrated and described in the examples below, it is to be appreciated and understood that these concepts are applicable to other types of engines, such as various in-line engines and V-style engines for example.

EXAMPLES

Figure 1:
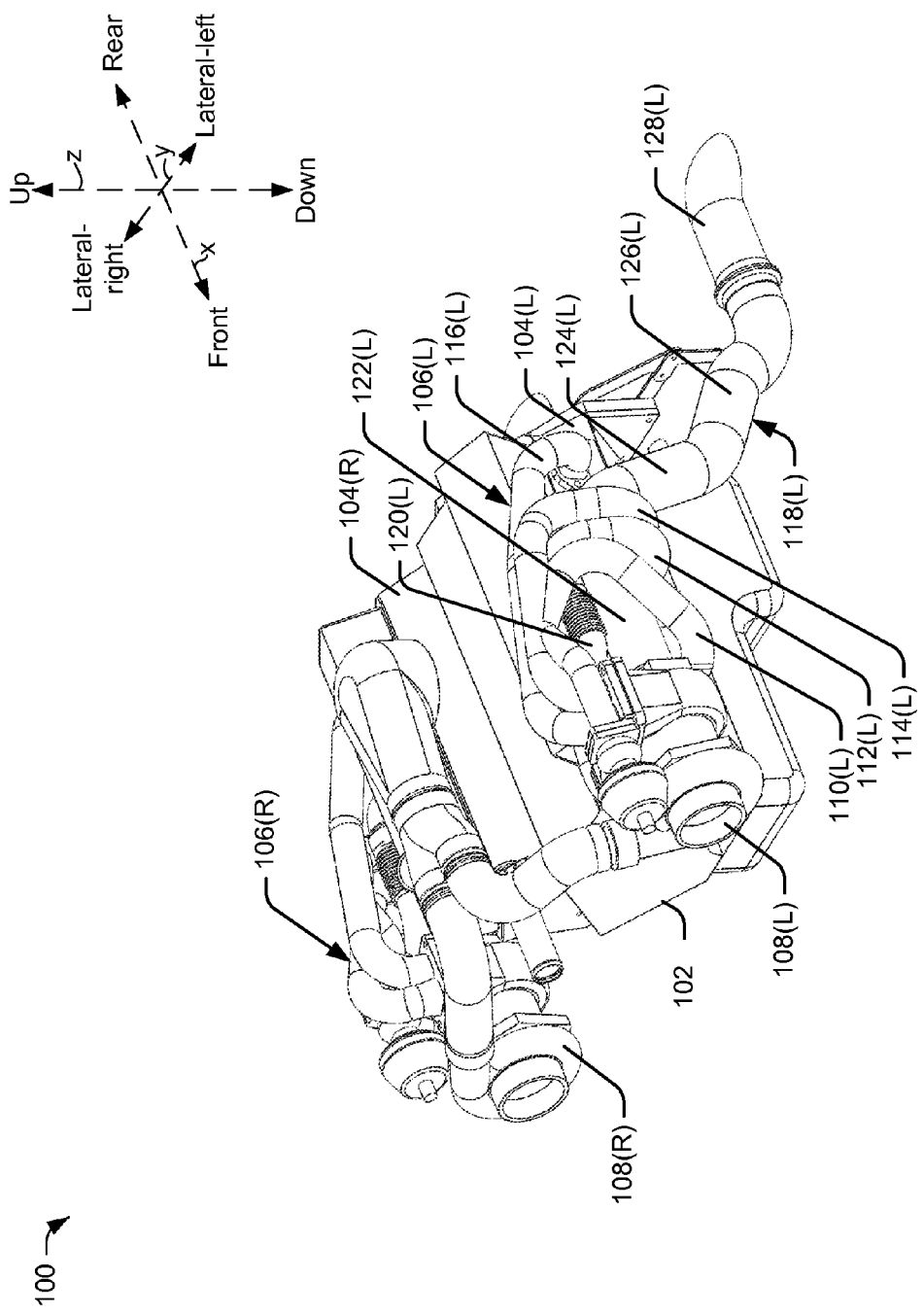
FIGS. 1-4 are perspective views of an example of an intertwining exhaust pipe system in accordance with some of the present concepts.
Figure 2:
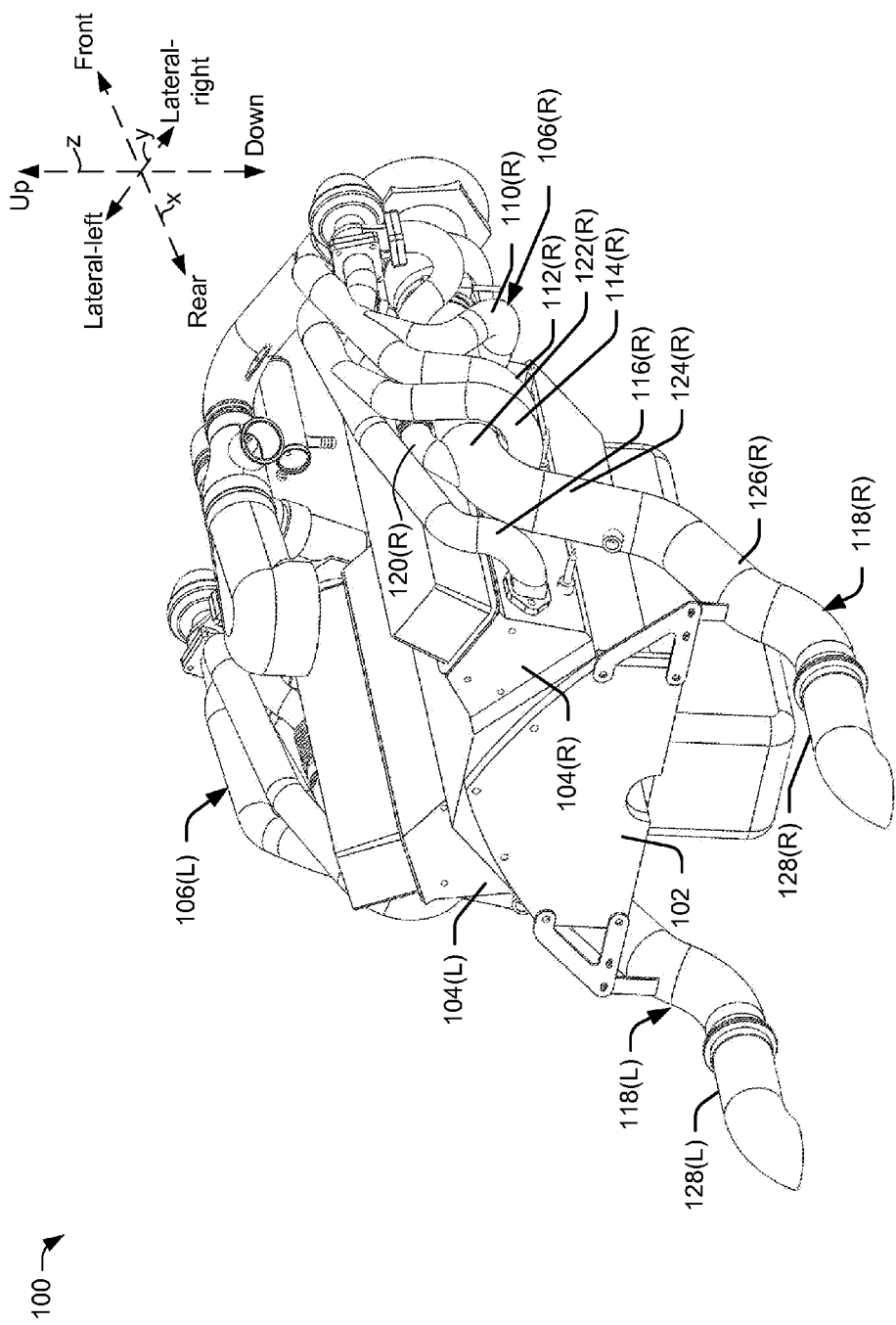
Figure 3:
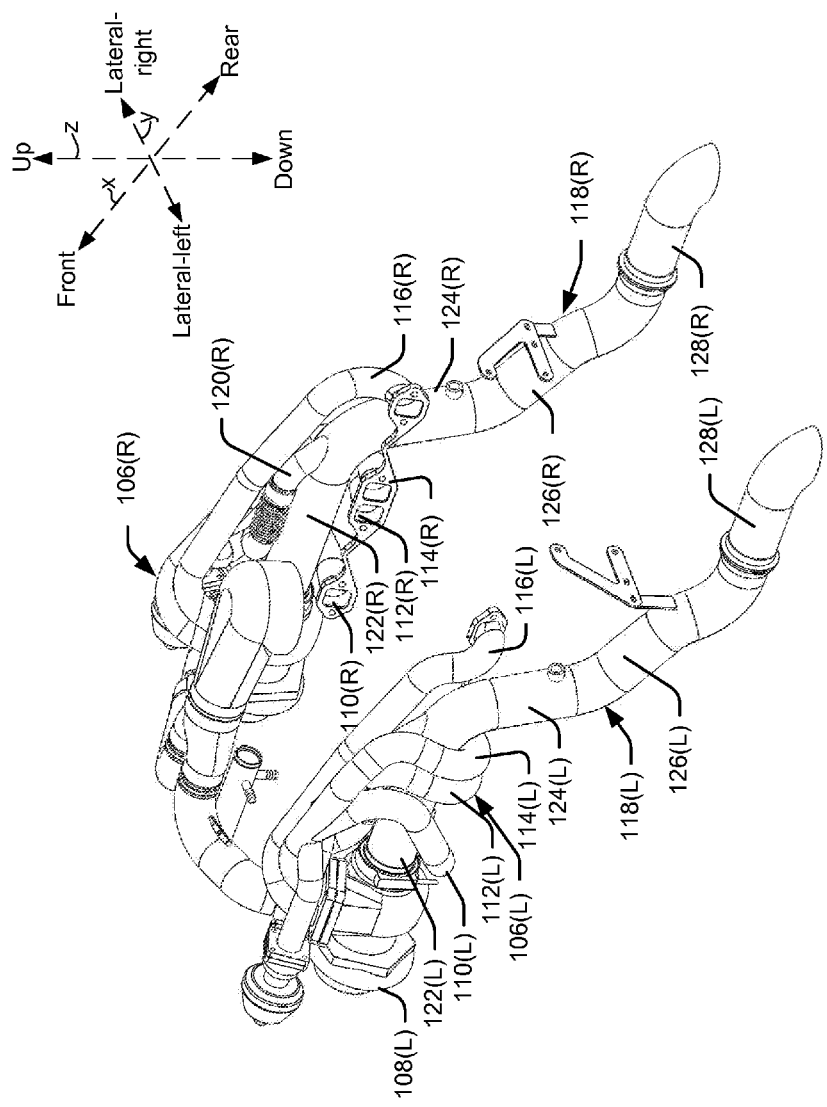
Figure 4:
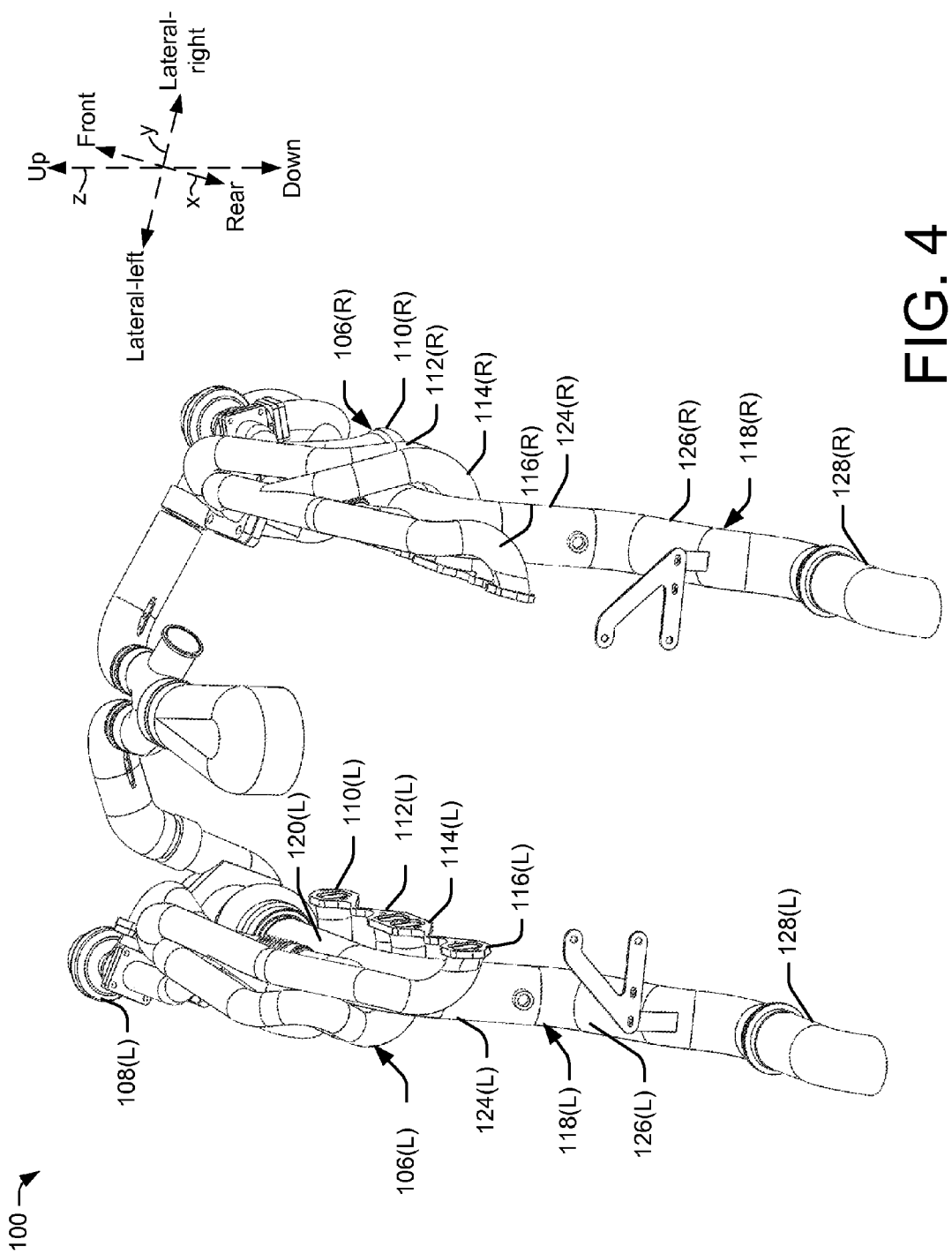
Figure 5:
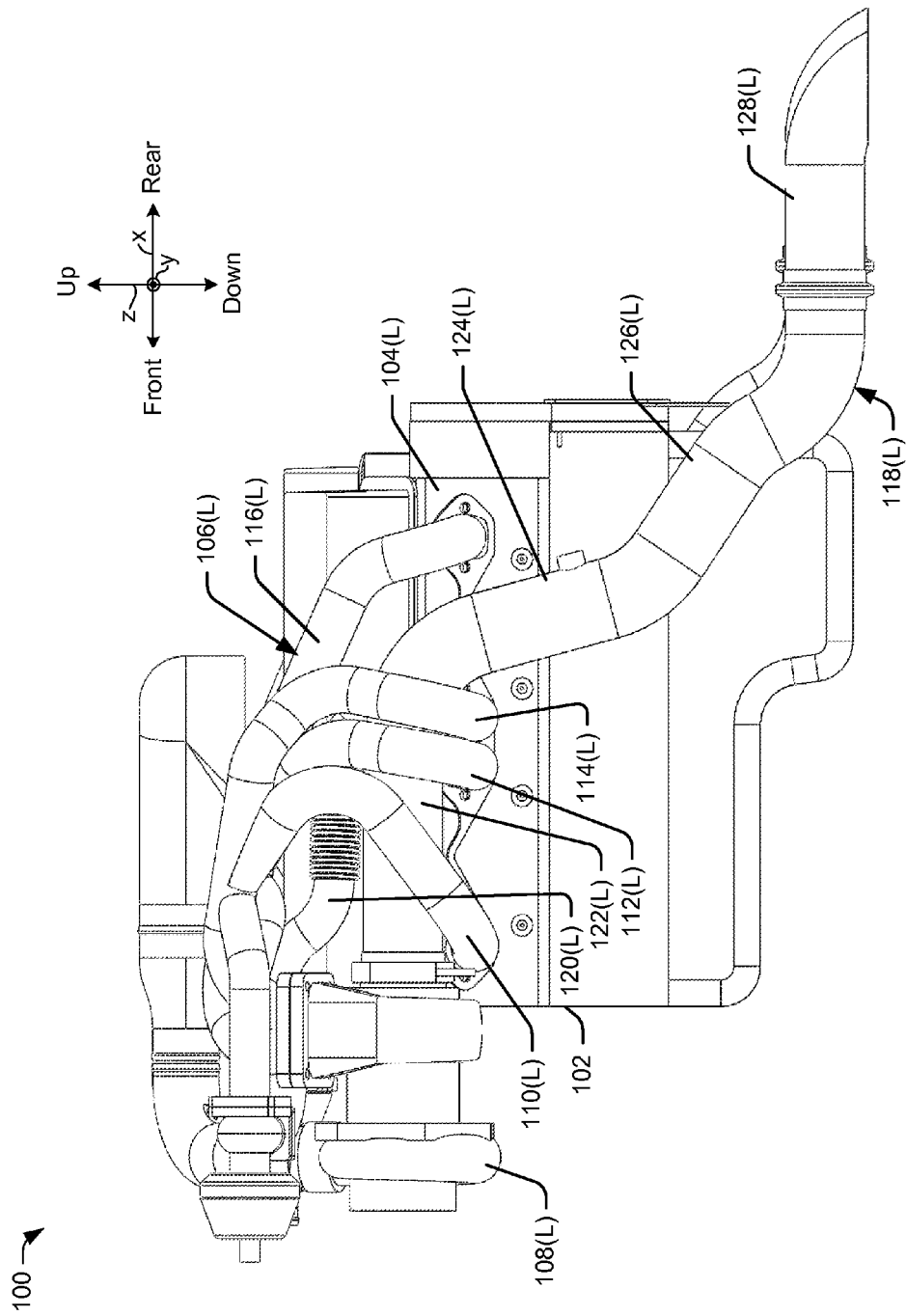
FIGS. 5-6 are side elevational views of an example of an intertwining exhaust pipe system in accordance with some of the present concepts.
Figure 6:
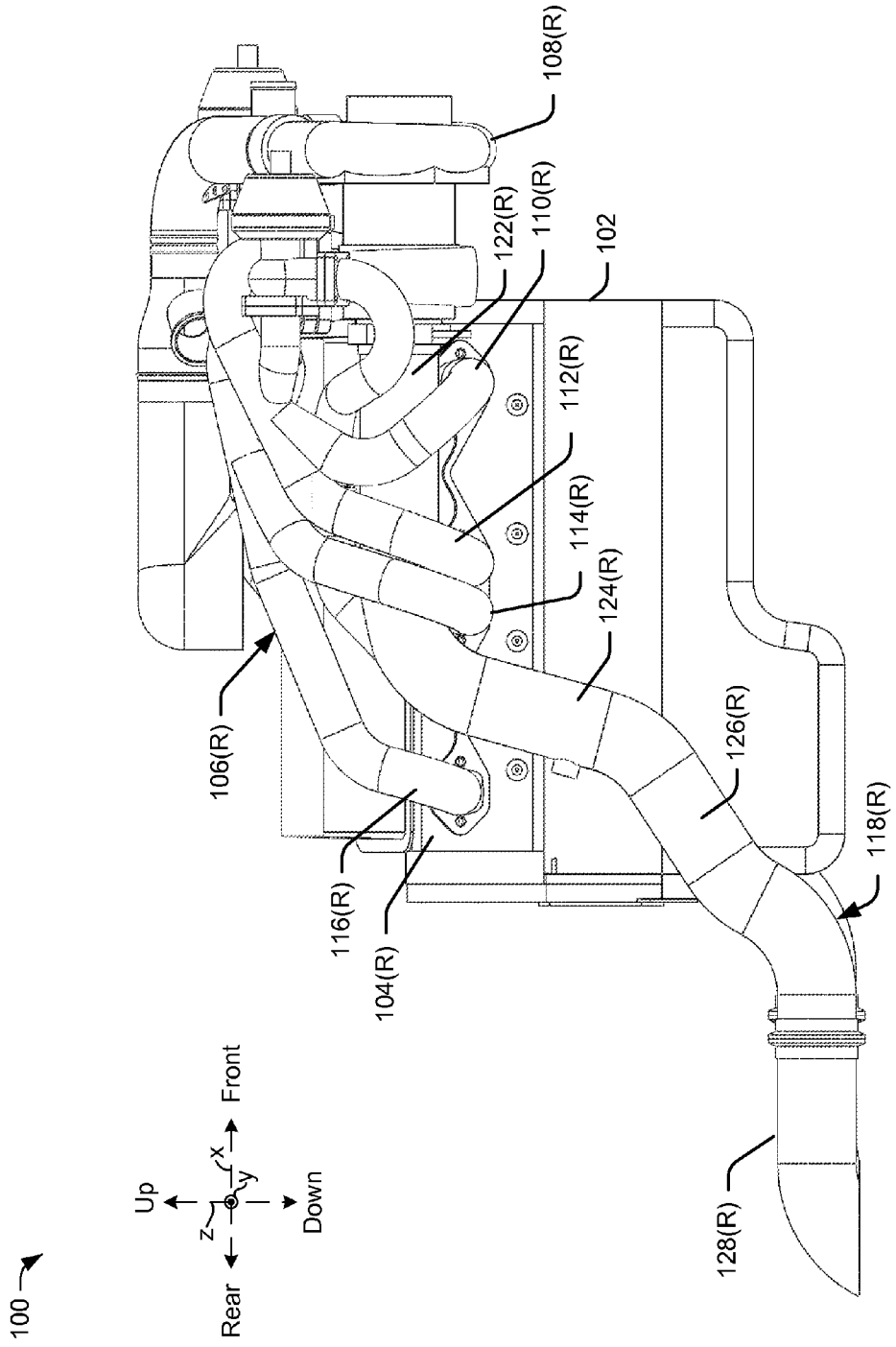

In one or more embodiments, an exhaust arrangement includes an intertwining PT exhaust pipe that extends generally rearward and downward in a direction generally away from the turbocharger. For example, in FIGS. 1-6 consider an example system, generally at 100, which utilizes an intertwining exhaust pipe arrangement. In this example, system 100 includes an example small block V8 internal combustion engine 102 (not shown in FIGS. 3-4). For the sake of clarity, system 100 is illustrated and described in a three-dimensional space which is labeled with the general directions: up/down, front/rear, and lateral (left/right (viewed from the rear of the engine looking forward) relative to engine 102.

Here, engine 102 is configured with left and right cylinder heads or heads 104(L) and 104(R), respectively, left and right sets of headers 106(L) and 106(R), respectively, and left and right turbochargers 108(L) and 108(R). (For the remainder of the discussion the naming convention of utilizing an "(L)" suffix for left side components and an "(R)" for right side components will be utilized in the drawings where feasible). In this case, the set of headers 106 includes four header exhaust pipes 110, 112, 114, and 116. The four header exhaust pipes 110, 112, 114, and 116 are configured to conduct exhaust gas away from head 104 to turbocharger 108. While four header exhaust pipes 110-116 are employed per head as illustrated and described in this example, it is to be appreciated and understood that the described techniques are equally applicable with respect to any number of exhaust pipes, and with respect to suitable engines having any number of cylinders. For instance, other implementations can accommodate inline six cylinder engines or V6, V10 or V12 engines, among others.

In this example, turbocharger 108 is also coupled or connected to a PT exhaust pipe or tube 118. Turbocharger 108 and PT exhaust pipe 118 are positioned proximate to head 104. PT exhaust pipe 118 extends generally horizontally and away from the turbocharger in the rearward direction and is configured to conduct exhaust gas away from turbocharger 108.

This implementation also includes a waste gate 120 that extends between an intake of the turbocharger 108 and the PT exhaust pipe 118. In situations where more exhaust volume is reaching the turbocharger than is needed the waste gate can allow some of the exhaust to bypass the turbocharger and go directly to the PT exhaust pipe.

In this implementation, PT exhaust pipe 118 includes a series of contiguous connected PT exhaust pipe portions 122, 124, and 126. While three PT exhaust pipe portions are illustrated and described in this example, it is to be appreciated and understood that the described techniques are equally applicable with respect to any suitable PT exhaust pipe having any number of PT exhaust pipe portions.

Here, first PT exhaust pipe portion 122 extends generally horizontally away from turbocharger 108 in a generally rearward direction (relative to engine 102) such that it remains positioned proximate to head 104. In this example, note that by extending generally horizontally and away from the turbocharger in the rearward direction, first exhaust pipe portion 122 extends above the proximate portions of header exhaust pipes 110, 112, and 114. Also, note that the distal portions of header exhaust pipes 110, 112, and 114 extend around and above first PT exhaust pipe portion 122 to eventually terminate at turbocharger 108, to which the header exhaust pipes are connected.

Continuing, second PT exhaust pipe portion 124 and third PT exhaust pipe portion 126 extend generally downward and rearward, and thus away from turbocharger 108. As shown, second PT exhaust pipe portion 124 and third PT exhaust pipe portion 126 extend below header exhaust pipe 116 in a series of one or more gradual "gentle" bends. In this example, each of these PT exhaust pipe "gentle" bends can have a bend radius of at least about 2 inches (as measured by their inside curvature) such that impedance of exhaust traveling away from turbocharger 108 is reduced or minimized, thus reducing or eliminating engine exhaust backpressure in PT exhaust pipe 118 and/or in header exhaust pipes 110-116. In at least some embodiments, this bend radius can be at least about 3 inches, while in others in can be at least about 4 inches. Third PT exhaust pipe portion 126 then terminates at a terminal exhaust component 128, to which it is connected. As such, PT exhaust pipe 118 effectively intertwines through header exhaust pipes (110-116) while remaining proximate to engine 102 and head 104 in a geometrically advantageous configuration or arrangement to conserve space and/or reduce or eliminate engine backpressure. PT exhaust pipe 118 can be made from any size pipe. For example, some implementations can employ PT exhaust pipes having a diameter in a range from about 2 inches to about 4 inches, though other values can also be employed. Header exhaust pipes 110-116 can be made from any size pipe. For example, some implementations can employ header exhaust pipes having a diameter in a range from about 1 inch to about 2.5 inches, though other values can also be employed. One implementation can employ a 3 inch PT exhaust pipe and 1.75 inch header exhaust pipes.

As introduced above, individual header exhaust pipes 110-116 include a proximate portion relatively close to the head. Individual header exhaust pipes 110-116 also include a distal portion that is relatively distant from the head but proximate to and eventually terminating at turbocharger 108 to which it is connected. Furthermore, this geometric arrangement allows header exhaust pipes (110-116) to extend from head 104 to turbocharger 108 in a series of one or more gradual "gentle" bends between respective proximate portions and distal portions. The header exhaust pipes' gentle bends can conserve space and/or reduce or eliminate engine backpressure. In this example, each of these header exhaust pipe "gentle" bends can have a bend radius of at least about 1 inch (as measured by their inside curvature), thus reducing or eliminating engine exhaust backpressure as well. In at least some embodiments, this bend radius can be at least about 2 inches, while in still others it can be at least about 3 inches. As will be discussed in more detail below relative to FIGS. 7-10, the present implementations can allow gentle bends to be employed in both the header exhaust pipes and the PT exhaust pipe while maintaining a compact exhaust system configuration or exhaust arrangement. Stated another way, individual header pipes can extend generally perpendicularly away from the cylinder head and then transition to a generally parallel orientation via one or more gentle bends. This generally parallel orientation can terminate at the turbocharger (or intake assembly thereof).

While in this example, PT exhaust pipe 118 is characterized by a series of gradual downward "gentle" bends, it is to be appreciated that a PT exhaust downpipe can be configured with any number of bends of any suitable bend radius(es) in accordance with the techniques disclosed herein. In addition, header exhaust pipes with any number of bends of any suitable bend radius(es) can also be employed in accordance with the techniques disclosed herein.

Further, in this example, the PT exhaust 118 passes over the first three header exhaust pipes 110, 112, and 114, and then downward between the third header exhaust pipe 114 and the fourth header exhaust pipe 116. In other implementations, the PT exhaust can pass downward between the first and second header exhaust pipes or second and third header exhaust pipes, among others. Exhaust port layout of the head 104 may be a factor that influences which header exhaust pipes the PT exhaust passes between. In still other configurations, the PT exhaust can extend above all of the header exhaust pipes in a generally horizontal direction and then extend downward behind the last (e.g., rear most) header exhaust pipe.

Another way of characterizing the implementation of system 100 is that PT exhaust pipe 118 can occur laterally in a space defined by header exhaust pipes (110-116). As such the PT exhaust pipe need not require additional lateral space distal to the engine. This aspect is more readily appreciated from FIGS. 7-10 and will be discussed in more detail below.

Figure 7:
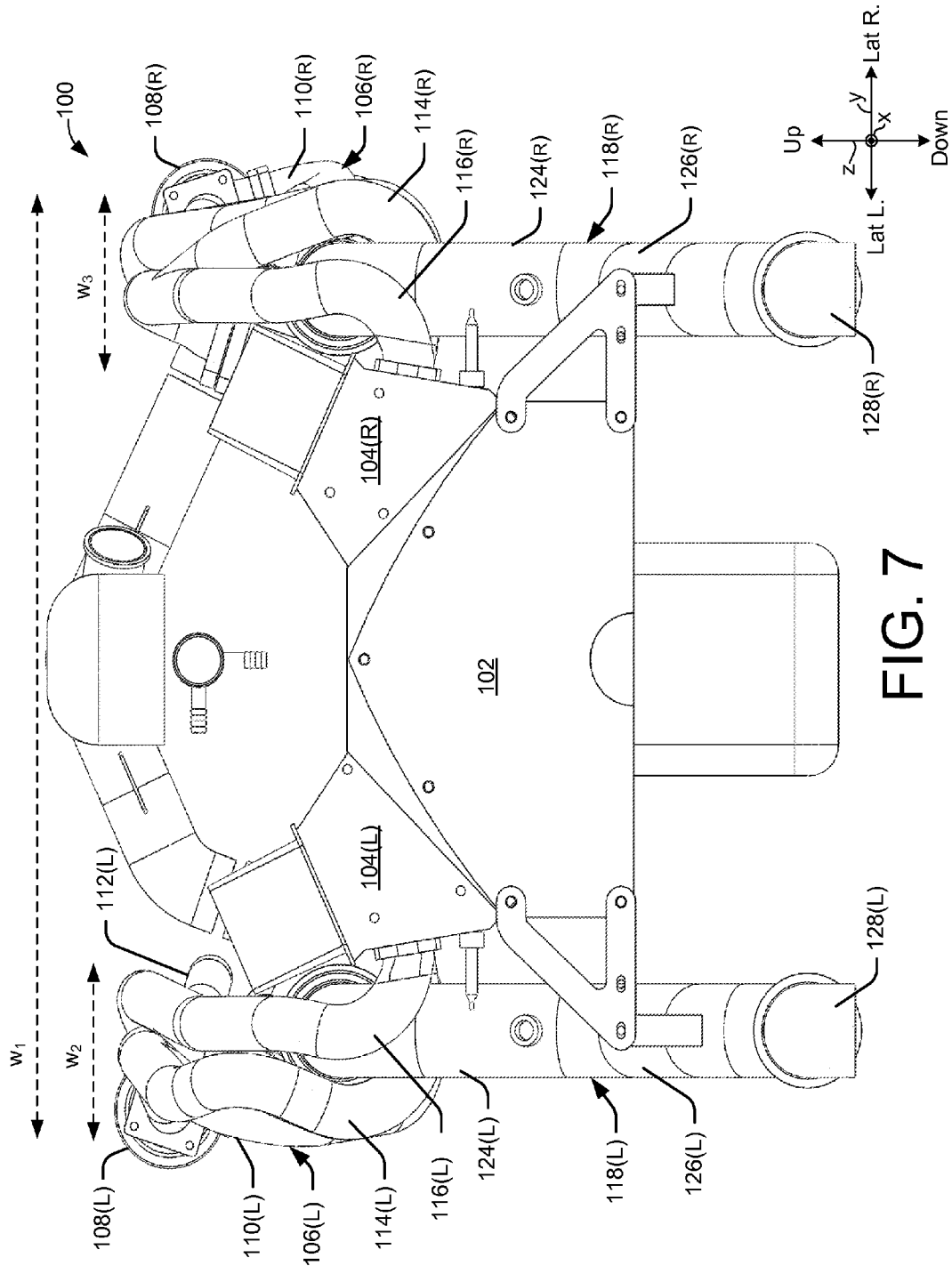
FIG. 7 is a rear elevational view of an example of an intertwining exhaust pipe system in accordance with some of the present concepts.
Figure 8:
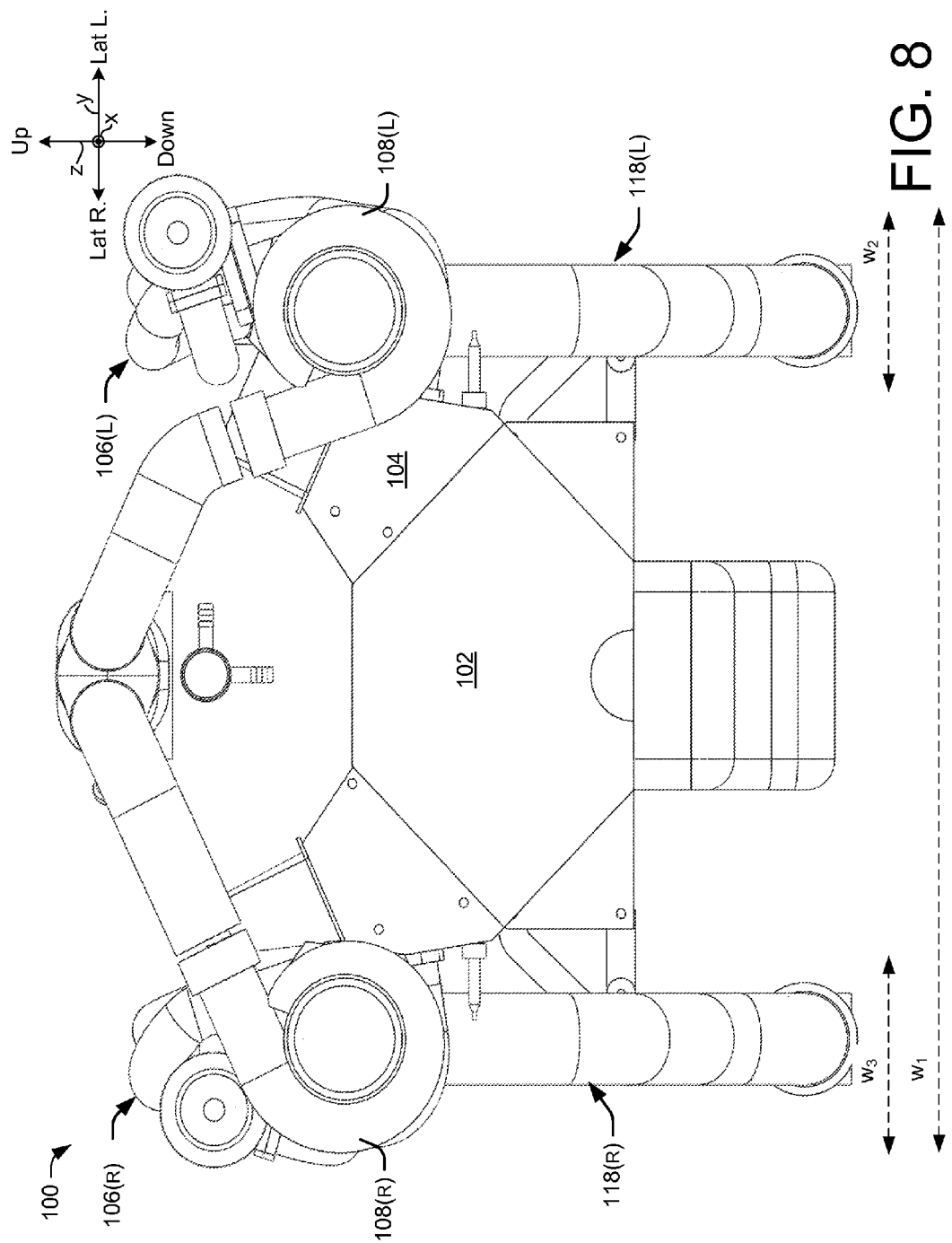
FIG. 8 is a front elevational view of an example of an intertwining exhaust pipe system in accordance with some of the present concepts.
Figure 9:
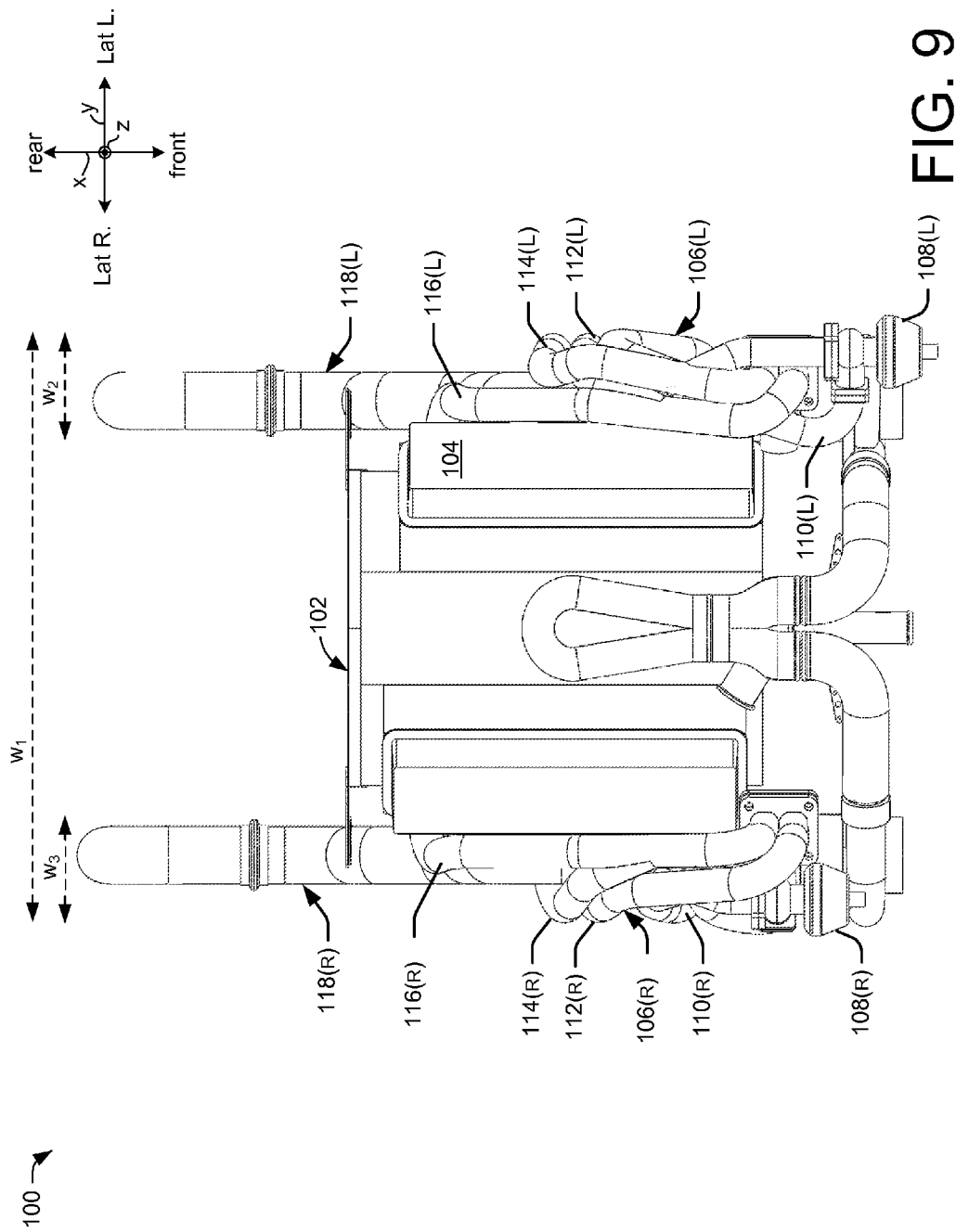
FIG. 9 is a top view of an example of an intertwining exhaust pipe system in accordance with some of the present concepts.
Figure 10:
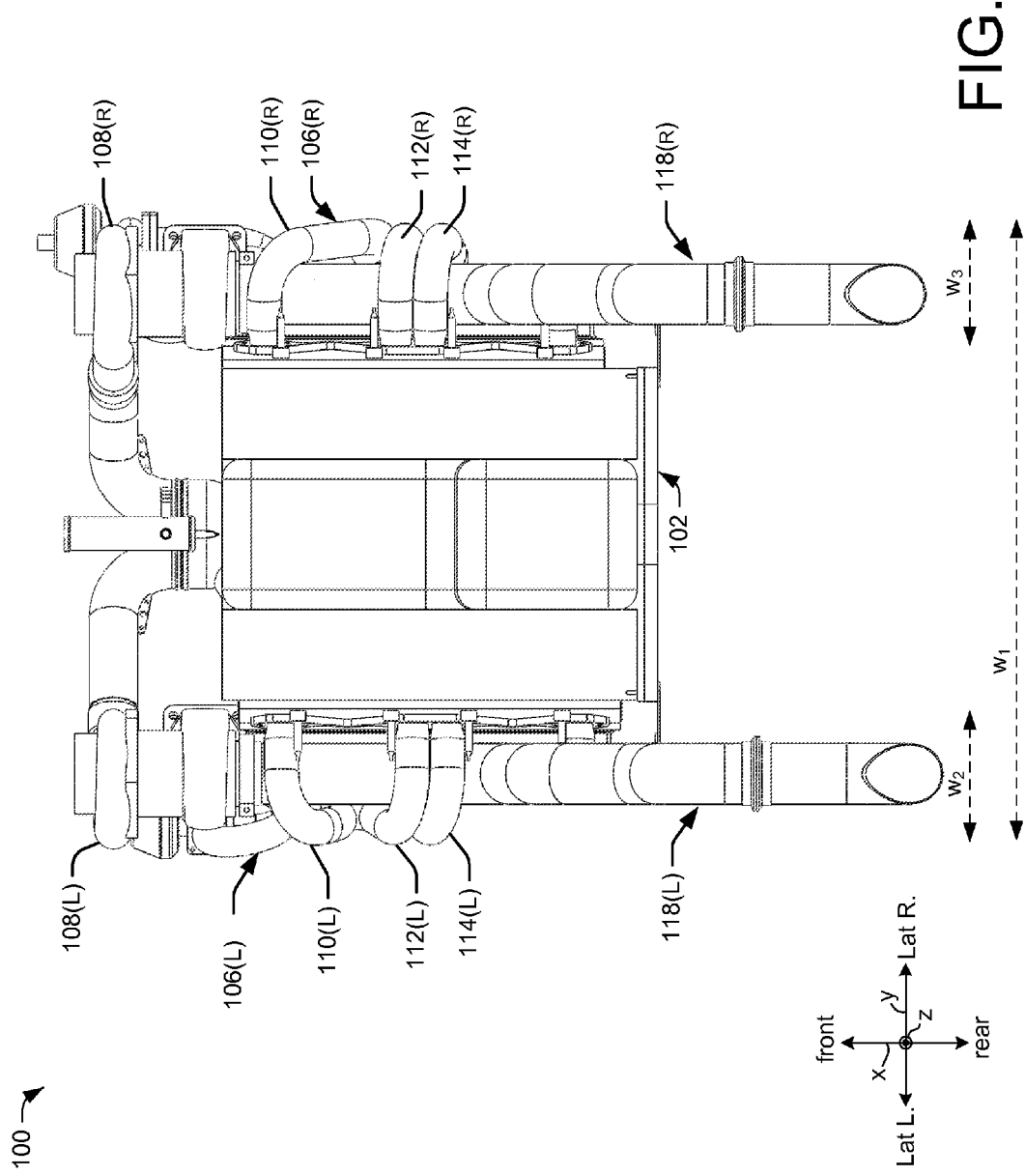
FIG. 10 is bottom view of an example of an intertwining exhaust pipe system in accordance with some of the present concepts.

FIGS. 7-10 collectively show several features of system 100. FIG. 7 shows a view of system 100 from the rear of engine 102 looking forward. FIG. 8 shows a view of system 100 from the front of engine 102 looking rearward. FIG. 9 shows a view looking down at engine 102 and FIG. 10 shows a view looking up at the engine.

Among other applications, system 100 can be installed in an environment, such as car that tends to be laterally constrained (i.e., space available for the system along the y-reference axis can be limited by the fenders and/or suspension parts). Accordingly, it can be beneficial to reduce an overall width $w_1$ of system 100. In this implementation, set of headers 110(L)-116(L) can define a width $w_2$ that can contribute to overall width $w_1$. Similarly, set of headers 110(R)-116(R) can define a width $w_3$ that can contribute to overall width $w_1$. However, PT exhaust pipe 118(L) can occur within width $w_2$ such that the PT exhaust pipe does not contribute to overall width $w_1$. Also, PT exhaust pipe 118(R) can occur within width $w_3$ such that the PT exhaust pipe does not contribute to overall width $w_1$. In summary, in this implementation, the width $w_2$ and/or $w_3$ of the set of exhaust headers 110-116 can be a product of the transition (i.e., the gentle bends) associated with the proximate portions of the header exhaust pipes extending generally perpendicular to the head 104 and then bending the tubes such that the respective distal ends are generally parallel to the head. The configuration of the PT exhaust pipe 118(L) can allow the PT exhaust pipe to exist within width $w_2$ along its length starting at turbocharger 108 (L) and culminating at terminal exhaust component 128(L). Similarly, the configuration of the PT exhaust pipe 118(R) can allow the PT exhaust pipe to exist within width $w_3$ along its length starting at turbocharger 108(R) and culminating at terminal exhaust component 128(R).

As mentioned above, many consumers desire gentle bends to be employed in the exhaust system or exhaust arrangement (i.e., set of exhaust headers 106 and PT exhaust 118) to decrease engine back pressure. Consider also that it can be advantageous to reduce an overall length of the exhaust system as length can also contribute to back pressure. Consider further that in some configurations, some or all of the weight of the turbochargers 108 can be supported by the exhaust headers 110-116 and/or PT exhaust 118. As a result, stress forces on the exhaust headers and/or PT exhaust can increase as a distance between the head and the turbocharger increases. Increased stress forces can increase the incidence of failure of the exhaust system (e.g., cracked pipes and/or welds). Note that as can be readily appreciated from FIG. 8, the present implementations can allow the turbochargers to be closely positioned to the heads relative to the z-reference axis (e.g., in this case the heads are at approximately the same height as the turbochargers). Note also as can be readily appreciated from FIGS. 9-10, the present implementations can allow the turbochargers to be closely positioned to the heads relative to the x and y-reference axis (e.g., in this case, along an outer lateral edge of and just in front of the head). Accordingly, these implementations can reduce exhaust system length, reduce stress induced on the exhaust system by the turbocharger, reduce an amount of space occupied by the exhaust system and maintain the gentle bends throughout the exhaust system.

The present exhaust systems can be manufactured from materials known in the industry utilizing known manufacturing techniques. For instance, tubing, such as metal tubing, can be shaped and/or formed in a desired shape to create a portion of the exhaust system. Shaped portions of the exhaust system can then be connected together, such as by welding or other techniques.

The invention claimed is:

1. A method comprising:
   extending a first portion of a post-turbocharger (PT) exhaust pipe connected to a turbocharger of an internal combustion engine away from the turbocharger in generally a rearward direction relative to the internal combustion engine and over at least one pipe of a set of header pipes connecting a head of an internal combustion engine with the turbocharger; and,
   extending at least a second portion of the PT exhaust pipe in generally the rearward direction away from the turbocharger and under at least one other pipe of the set of header pipes effective that the PT exhaust pipe passes between the at least one pipe of the set of header pipes and the at least one other pipe of the set of header pipes.

2. The method of claim 1, wherein the first portion and the second portion remain in a position proximate to the internal combustion engine.

3. The method of claim 1, wherein the first portion extends generally horizontally in a rearward direction relative to the internal combustion engine.

4. The method of claim 1, wherein the second portion travels generally downward in the rearward direction in a series of one or more bends.

5. The method of claim 4, wherein the one or more bends have a bend radius of at least 2 inches.

6. The method of claim 5, wherein the one or more bends have a bend radius of at least 3 inches.

7. The method of claim 1, wherein individual header pipes of the set of header pipes comprise one or more bends having a bend radius of at least 1 inch.

8. The method of claim 7, wherein individual header pipes of the set of header pipes comprise one or more bends having a bend radius of at least 2 inches.

9. The method of claim 1, further comprising conducting exhaust away from the turbocharger along the first and second portions in generally the rearward direction.

10. A system comprising:
    an internal combustion engine configured with a turbocharger; and,
    an exhaust arrangement comprising a post-turbocharger (PT) exhaust pipe connected to the turbocharger and positioned proximate to the internal combustion engine, the PT exhaust pipe extending away from the turbocharger along the internal combustion engine and comprising:
    a first portion extending above at least one part of a set of header exhaust pipes connecting the internal combustion engine with the turbocharger; and,
    one or more additional connected and contiguous portions extending below at least one other part of the set of header exhaust pipes effective that the PT exhaust pipe passes between a first individual header exhaust pipe of the set of header exhaust pipes and a second individual header exhaust pipe of the set of header exhaust pipes.

11. An exhaust arrangement comprising:
    a post-turbocharger (PT) exhaust pipe connectable to a turbocharger of an internal combustion engine and positioned proximate to the internal combustion engine, the PT exhaust pipe extending away from the turbocharger in a generally rearward direction with respect to the internal combustion engine and comprising:
    a first portion extending in the generally rearward direction and above at least one pipe of a set of header pipes connecting the internal combustion engine with the turbocharger; and,
    one or more additional connected and contiguous portions extending in the generally rearward direction below at least one other pipe of the set of header pipes effective that the PT exhaust pipe passes between the at least one pipe and the at least one other pipe.

12. An exhaust arrangement comprising:
    a set of header pipes configured to extend from a cylinder head to a turbocharger; and,
    a post-turbocharger (PT) exhaust pipe configured to extend from the turbocharger along the cylinder head above at least one header pipe of the set of header pipes and to pass downward between at least two header pipes of the set of header pipes proximate to the cylinder head.

13. A post-turbocharger (PT) exhaust pipe comprising:
    at least a portion configured to extend from a turbocharger of an internal combustion engine along a cylinder head above at least one header pipe of a set of header pipes, individual pipes of the set of header pipes configured to extend from the cylinder head to the turbocharger; and,
    at least another portion configured to pass downward between at least two header pipes of the set of header pipes proximate the cylinder head.

14. PT exhaust pipe of claim 13, wherein the portion is configured to pass above at least two individual header pipes.

15. The PT exhaust pipe of claim 13, wherein a transition between the portion and the another portion is achieved with a gentle bend that has an inside radius of at least 3 inches.

* * * * *